Nov. 3, 1964   C. BELSKY   3,155,420
VEHICLE BODY CORNER PILLAR CONSTRUCTION
Filed May 21, 1962   2 Sheets-Sheet 2

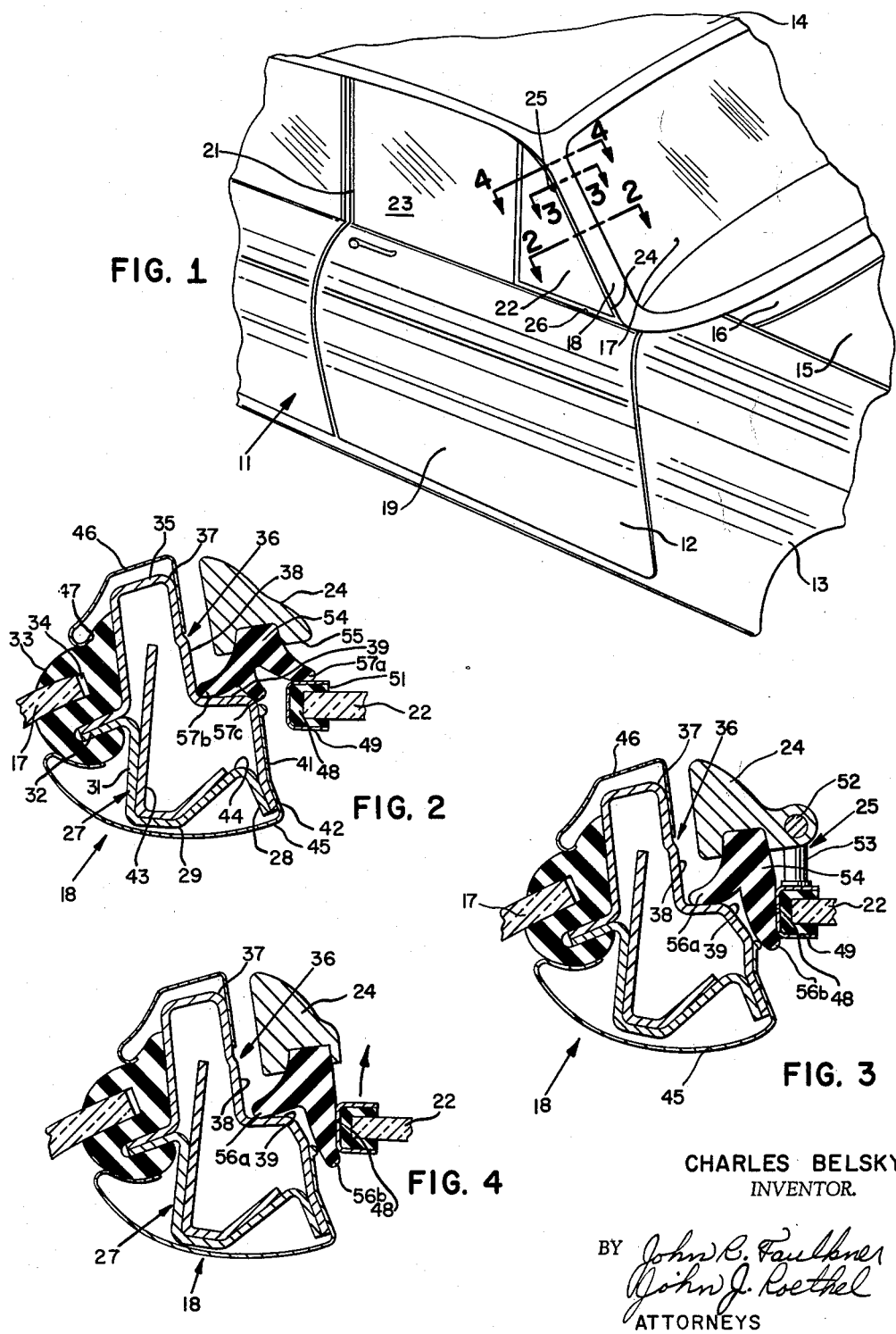

CHARLES BELSKY
INVENTOR.

BY John R. Faulkner
John J. Roethel
ATTORNEYS

United States Patent Office 3,155,420
Patented Nov. 3, 1964

3,155,420
VEHICLE BODY CORNER PILLAR
CONSTRUCTION
Charles Belsky, Detroit, Mich., assignor to Ford
Motor Company, Dearborn, Mich., a corporation
of Delaware
Filed May 21, 1962, Ser. No. 196,101
3 Claims. (Cl. 296—44)

This invention relates generally to motor vehicles and more specifically to an improved body construction for motor vehicles.

In conventional motor vehicle body construction, the structural support between the forward corner portion of the roof and the cowl structure comprises a pillar or post. At its side facing forwardly of the vehicle, the pillar has interlocking engagement with a weather strip or sealing strip which is mounted on the periphery of the vehicle windshield. At its side facing rearwardly of the vehicle, the pillar defines a portion of the body opening for the vehicle door. The portion of the vehicle door adjacent the pillar generally comprises a leg of a vent window supporting framework. A weather strip or sealing strip is interposed between the pillar surface and the opposing surface of the vent window frame leg. This weather strip may be mounted on either the pillar surface or the frame leg surface. Another weather strip is interposed between the frame leg and the opposing edge of the vent window glass, this latter weather strip being mounted on the surface of the frame leg. The windshield weather strip, pillar, door weather strip, vent window frame and vent window seal are positioned generally in substantially longitudinal alignment. This results in an opaque wall at the forward corner of the vehicle passenger compartment. This wall undesirably obstructs the field of vision of the vehicle operator.

The present invention provides an improved construction and arrangement of a vehicle body in which the longitudinal extent of the opaque corner wall is materially reduced without affecting the requisite structural rigidity of the windshield pillar or the sealing characteristics of the various weather seals. This is accomplished by the outboard relocation of the vent window frame leg so that it is contiguous and complementary to the offset provided in the structural member forming the windshield pillar. This permits the vent window frame leg to be positioned in lateral relationship to the pillar when the vehicle door is closed rather than in the conventional longitudinal relationship. This also allows the placing of the weather strip in sealing relationship between opposed lateral surfaces of the pillar and frame leg rather than between opposed end faces as in conventional structures.

The result is a substantial reduction in cross sectional area of the pillar and associated weather strips and thereby an improved field of vision at the forward corners of the passenger compartment.

Other objects and advantages of this invention will be made more apparent as this description proceeds, particularly when considered in connection with the accompanying drawings, wherein:

FIGURE 1 is a perspective view of a portion of a motor vehicle body incorporating one embodiment of the present invention;

FIGURE 2 is an enlarged vertical cross sectional view lying substantially on the plane indicated by line 2—2 of FIGURE 1;

FIGURE 3 is an enlarged cross sectional view taken substantially on the plane indicated by line 3—3 of FIGURE 1;

FIGURE 4 is an enlarged cross sectional view taken substantially on the plane indicated by line 4—4 of FIGURE 1;

Figure 6:
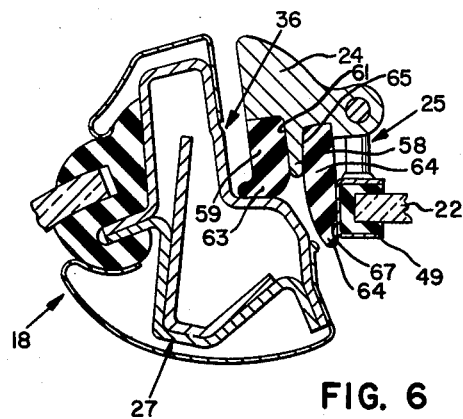
FIGURE 6 is a view in part similar to FIGURE 3 further illustrating the FIGURE 5 embodiment of this invention.

Referring to the drawing and in particular to FIGURE 1 there is shown a motor vehicle body 11 having a front door 12, a front side panel 13, a roof structure 14, a hood 15 and an upper cowl structure 16. A curved windshield 17 is supported at the top and bottom by the roof panel and the upper cowl structure 16, respectively. Also, the windshield 17 is supported by a pair of windshield pillars or posts at opposite sides of the vehicle with the right one of the windshield pillars or posts 18 being shown in FIGURE 1. The front door 12 has a lower door structure 19 which includes a forward portion offset forwardly of the windshield pillar 18 and connected by hinges (not shown) at its forward edge to the adjacent body structure. A fixed frame 21 extends upwardly from the lower door structure 19 and provides support for a pivotable vent window 22 and a vertical slidable window 23. The fixed frame 21 has a vent window supporting frame member 24 substantially parallel with and adjacent to the rearward facing edge of the windshield pillar post 18. The vent window 22 is pivotally supported by a first pivot 25 attached to the vent window support frame member 24 and a second pivot 26 attached to the lower door structure 19 to permit the manual swinging movement of the vent window 22 to an opened position.

As seen in FIGURE 2, the windshield pillar comprises a hollow structural member 27 which is formed from a steel strip having overlapping portions welded together to form an inwardly extending flange 28. The hollow structural member 27 has an inwardly facing surface 29 which is substantially flush with the terminal end of the flange 28. On the forwardly facing surface 31 of the hollow structural member 27 there is shown a second flange 32 to which a weather strip 33 is securely attached. This weather strip 33 has a recess 34 to receive the side edge of the wrap-around windshield 17. The outer facing surface 35 of the hollow structural member 27 is substantially reduced in width by an offset, generally designated as 36, which begins at the rearward outer edge 37 of the windshield pillar 18. This offset 36, which extends inwardly from the outer edge 37, is substantially L-shaped and is defined by a rearwardly facing surface 38 and an outwardly facing surface 39. The outwardly facing surface 39 of the offset 36 is approximately halfway between the outer edge 37 and the inwardly facing surface 29 of the hollow structural member 27. From the offset 36 the rearwardly facing surface 41 of the hollow structural member 27 continues until it terminates in a flange portion 42 which is joined with the beginning of the metal strip.

An L-shaped reinforcing member 43 is attached to the inside surfaces 44 of the hollow structural member 27 to provide additional rigidity for the windshield pillar post 18.

The hollow structural member may be decoratively trimmed by an interior molding strip 45 of a generally arcuate cross section which is attached at one end to the rearwardly facing surface 41 of the hollow structural member 27 and at the other end to the windshield weather strip 33. A second molding strip 46 may be provided to conceal the outer facing surface 35 of the hollow structural member 27. One end of the second molding strip 46 is clamped to a portion of the rearwardly facing surface 38 of the offset 36 and the other end is received by a groove 47 in the windshield weather strip 33.

The vent window supporting frame member 24 defining one edge of the fixed frame 21 is substantially received within the offset 36 and is in a contiguous and complementary relationship to the offset 36 at the outer edge 37 of the windshield pillar 18 when the door 12 is in the closed position as shown in the drawing.

The vent window 22 is longitudinally spaced rearwardly from the hollow structural member 27 and laterally spaced inwardly from the vent window supporting frame member 24. The vent window 22 has a forward edge portion 48 which is held in a frame channel 49 with a sealing strip 51 interposed between the frame channel 49 and the glass plate.

In FIGURE 3 is seen a section through the first pivot 25 detailing the pivotal support for the vent window 22. This first pivot 25 comprises a pivot pin 52 to which one end of a pivot arm 53 is attached while the other end of the pivot arm 53 is directly secured to the vent window frame channel 49. The pivotal arrangement permits the forward edge portion 48 of part of the pivotable vent window 22 above the first pivot 25 to move outwardly while part of the vent window 22 below the first pivot 25 moves in an inward direction when the vent window 22 is manually swung to its exhaust position.

A vertically extending weather strip 54 is secured to the inwardly facing surface 55 of the vent window supporting frame member 24. This weather strip 54 is usually formed from a spongy cellular sealing material to provide sealing contact between the door 12 and the windshield pillar 18 when the door 12 is in a closed position. The weather strip 54 has a first portion above the first pivot 25 which has two inwardly extending lips 56. A second portion of the weather strip 54 extends downwardly from the first pivot 25 towards the lower door structure 19. This second portion of the weather strip 54, which is integrally formed with the first portion, has three inwardly extending lips 57 as best seen in FIGURE 2. The three lips 57 of the lower portion of the weather strip 54 extend inwardly with one of the lips 57a in a sealing contact with the vent window frame channel 49 when the vent window 22 is in a closed position. The remaining two lips 57b and 57c extend inwardly and forwardly to provide sealing contact with the rearwardly facing surface 38 and the outwardly facing surface 39 of the offset 36 when the door 12 is in a closed position. Above the first pivot 25, the two lips 56 of the first portion of the weather strip 54 extend inwardly with one lip 56a extending forwardly and inwardly to make sealing contact with the surfaces of the offset 36 while the other lip 56b extends rearwardly and inwardly to make sealing contact with the frame channel 49 of the vent window 22 when the vent window 22 is in a closed position.

Since the forward edge portion 48 of the vent window 22 above the first pivot 25 moves outwardly in the direction of the arrow as seen in FIGURE 4, no additional lips are required between the vent window 22 and the vent window supporting frame member 24.

Figure 5:
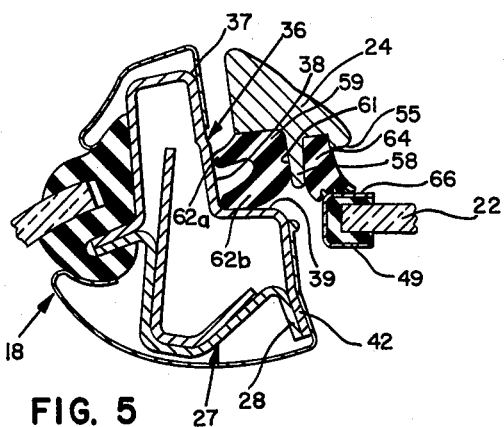
FIGURE 5 is a view in part similar to FIGURE 2 depicting a second embodiment of this invention.
Figure 7:
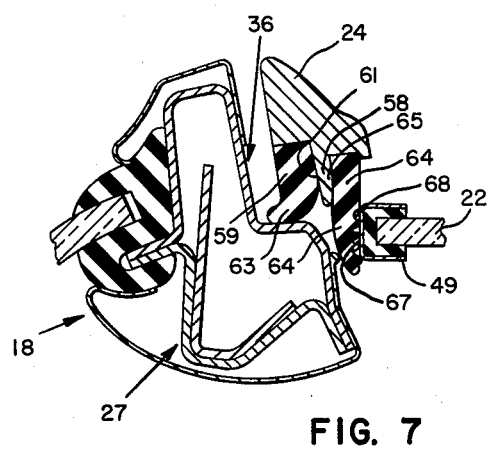
FIGURE 7 is a view in part similar to FIGURE 4 further illustrating the second embodiment of this invention; and, FIGURE 8 is a view in part similar to FIGURE 2 illustrating a further embodiment of this invention.
Figure 8:
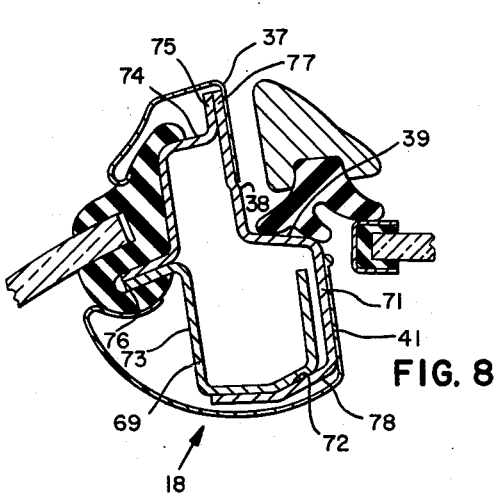

In FIGURES 5, 6 and 7 a second embodiment depicting an alternate construction of the windshield pillar post 18 is shown, and in FIGURE 8 a further embodiment is illustrated. In FIGURES 5 through 8, like reference numerals are applied to members or surfaces which are similar in construction to members or surfaces shown in the first embodiment.

In the second embodiment shown in FIGURES 5 through 7, an inwardly extending projection 58 is provided on the inwardly facing surface 55 of the vent window supporting frame member 24 intermediate its longitudinal sides. The projection 58 is relatively small and permits the entire vent window supporting frame member 24 to be contiguous to the offset 36 at the outer edge 37 of the hollow structural member 27. A substantially vertically extending weather strip 59, which may be formed from a spongy cellular sealing material, is attached to the forward face 61 of the projection 58. As seen in FIGURE 5, this weather strip 58 has two inwardly extending lips 62 below the first pivot 25 with one lip 62a in contact with the rearwardly facing inner surface 38 of the offset 36 and the other lip 62b in sealing contact with the outwardly facing inner surface 39 of the offset 36.

Above the first pivot 25, best seen in FIGURE 6, only one lip 63 is provided which is in sealing contact with the offset 36 of the hollow structural member 27. A second weather strip 64, which is affixed to the rearward face 65 of the projection 58 provides sealing contact with the outward face 66 of the vent window frame channel 49 below the first pivot 25 as seen in FIGURE 5 and with the forward face 67 of the vent window frame channel 49 above the first pivot 25 as seen in FIGURES 6 and 7. The second weather strip 64 is formed from a relatively hard sealing material which may be provided with teeth portions 68 at preselected areas. These teeth portions 68 are relatively flexible and therefore provide a better sealing contact between the selected portions of the weather strip 64 and the vent window frame channel 49.

In FIGURE 8 is seen a further alternate embodiment of the windshield pillar post 18 in which the hollow structural member 27 is reduced in cross section without loss of rigidity. In this embodiment, the hollow structural member 27 is formed from two vertical metal strip portions comprising a forward section 69 and a rearward section 71 instead of one continuous strip as in the previously discussed embodiments.

The forward section 69 has a first inwardly facing surface 72 and a forwardly facing surface 73 before it terminates in an inverted L-shaped portion 74 to form one leg of an outwardly facing flange 75. A second flange 76 is integrally formed with the forwardly facing surface 73 by overlapping sections of the forward section 69, the flange 76 being substantially normal to the forwardly facing surface 73. The rearward section 71 is provided with an offset 36 defined by a rearwardly facing surface 38 and an outwardly facing surface 39 with the rearwardly facing surface 38 having a flange portion 77 beginning at the outer edge 37. The rearwardly facing surface 41 of the rearward section 71 is bent 90 degrees to form a second inwardly facing surface 78 which overlaps the first inwardly facing surface 72 of the forward section 69. The two sections are joined at the overlapping inwardly facing surfaces 72 and 78 and at the flange portion 77 that overlaps the leg of the flange 75 extending in an outward direction.

This alternate embodiment permits the elimination of a reinforcing member since a structural rigidity is effected which is equivalent to the windshield pillar post 18 depicted in the first and second embodiments. Also, the cross sectional area of the hollow structural member 27 of this embodiment is further reduced since the inwardly extending flange 28 and flange portion 42 of the hollow structural member 27 as shown in the previous embodiments have been eliminated.

From the foregoing it will be seen that the hollow structural member 27 for the windshield pillar post of this invention is substantially reduced in cross section due to the outboard relocation of the vent window supporting frame member 24 so that it is contiguous and complementary to the offset 36 at the outer edge of the hollow structural member 27 when the door structure 19 is in a closed position.

Additional advantages are obtained from the second embodiment shown in FIGURES 5 through 7 since this construction permits the use of two different types of weather strips 59 and 64. The first weather strip 59, which is made from a spongy cellular sealing material to meet engineering requirements, quite frequently needs replacement due to pressure exerted on it by the relatively sharp edge of the door 12. The second weather strip 64 is relatively stationary and not subjected to the shear stresses of the first weather strip. Therefore, the second weather strip 64 can be fabricated from a mechanical hard rubber material which is less prone to failure. The use of flexible teeth portions 68 provide a firm sealing contact without sacrificing any of the sealing characteristics of a mechanical hard rubber weather strip. It can be seen that the first weather strip 59 may be replaced without requiring removal of the second weather strip 64, thereby substantially reducing cost of maintenance.

In the alternate embodiment shown in FIGURE 8, the cross sectional area of the hollow structural member 27 for the windshield pillar post 18 is still further reduced without sacrificing rigidity by fabricating the hollow structural member 27 from two sections 69 and 71 and welding the overlapping portions together instead of forming it from one continuous metal strip.

It will be understood that the invention is not to be limited to the exact construction shown and described but that various changes and modifications may be made without departing from the spirit and scope of the invention as defined in the appended claims.

I claim:

1. In a vehicle body structure, a roof supporting windshield pillar having a first rearwardly facing surface and an inwardly facing surface, said first rearwardly facing surface having a stepped portion, said stepped portion being defined by a second rearwardly facing surface beginning at the outer edge of said pillar and an outwardly facing surface intermediate the outer edge and the inwardly facing surface of said pillar, a vent window supporting frame member having an inwardly facing surface, said frame member being mounted on said body for swingable movement into and out of contiguous relationship to said windshield pillar, said supporting frame member in said contiguous relationship being spaced rearwardly of said rearwardly facing surface of said stepped portion and spaced laterally outwardly of said outwardly facing surface of said stepped portion, a vent window pivotally mounted on said supporting frame member and longitudinally spaced rearwardly from said pillar and laterally inwardly from said supporting frame member, and at least one weather strip extending in a vertical direction and affixed to the inwardly facing surface of said supporting frame member, said weather strip having at least two lips with one lip being disposed between and in sealing contact with said pillar and said supporting frame member, the other lip being disposed between and in sealing contact with said vent window and said supporting frame member when said vent window and said frame member are in said contiguous relationship.

2. In a vehicle body construction, a door mounted for movement to an opened or closed position, a windshield pillar comprising a generally upright hollow structural member, said structural member having a first rearwardly facing surface and an inwardly facing surface, said first rearwardly facing surface having an offset beginning at its outer edge, said offset being defined by a second rearwardly facing surface beginning at the outer edge and an outwardly facing surface intermediate the outer edge and the inwardly facing surface of said structural member, a vent window supporting frame member attached to said door and having an inwardly facing surface, said supporting frame member in the door closed position extending rearwardly of said vehicle body and in contiguous relationship to said rearwardly facing surface of said offset at said outer edge of said pillar, a vent window means for pivotally connecting said vent window to said supporting frame member for movement between closed and opened positions, said vent window being longitudinally spaced rearwardly from said hollow structural member and laterally inwardly from said supporting frame member, and at least one weather strip extending in a vertical direction and affixed to the inwardly facing surface of said supporting frame member, said weather strip having three lips in the portion below said pivotal connection and two lips in the portion above said pivotal connection, said lips on said weather strip being disposed in the space defined by said hollow structural member, said supporting frame member, and said vent window, and in sealing contact with said members when said vent window and said door are in closed positions.

3. In a vehicle body construction, a door mounted for movement to an opened or closed position, a windshield pillar comprising a generally upright hollow structural member having a first rearwardly facing surface and an inwardly facing surface, said first rearwardly facing surface having an offset beginning at its outer edge, said offset being defined by a second rearwardly facing surface beginning at the outer edge and an outwardly facing surface intermediate the outer edge and said inwardly facing surface of the structural member, a vent window supporting frame member attached to said door and having an inwardly facing surface, said supporting frame member in the door closed position extending rearwardly of said vehicle body and in contiguous relationship to the second rearwardly facing surface of said offset at said outer edge of said pillar, a vent window, means pivotally connecting said vent window to said supporting frame member for movement between opened and closed positions, said vent window being longitudinally spaced rearwardly from said hollow structural member and laterally inwardly from said supporting frame member, and at least one weather strip extending in a generally vertical direction and affixed to the inwardly facing surface of said support frame member, said weather strip having a first portion with three inwardly extending lips below the pivotal connection and a second portion with two inwardly extending lips above said pivotal connection, one of said lips of said first portion being in sealing contact with said rearwardly facing inner surface of said offset, a second of said lips of said first portion being in sealing contact with said outwardly facing inner surface of said offset and the third of said lips of said first portion being in sealing contact with said vent window when said vent window and said door are in closed position, one of said lips of said second portion being in sealing contact with one of said surfaces of said offset and the other lip of said second portion being in sealing contact with said vent window when said vent window and said door are in closed positions.

References Cited in the file of this patent

UNITED STATES PATENTS

| | | |
|---|---|---|
| Re. 18,866 | Wright | June 13, 1933 |
| 2,620,221 | Romano | Dec. 2, 1952 |
| 2,719,749 | Richards | Oct. 4, 1955 |
| 2,733,096 | Waterhouse | Jan. 31, 1956 |